(12) United States Patent
Gu et al.

(10) Patent No.: US 11,393,103 B2
(45) Date of Patent: Jul. 19, 2022

(54) TARGET TRACKING METHOD, DEVICE, SYSTEM AND NON-TRANSITORY COMPUTER READABLE MEDIUM

(71) Applicant: BOE Technology Group Co., Ltd., Beijing (CN)

(72) Inventors: Yu Gu, Beijing (CN); Yuhai Sun, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 26 days.

(21) Appl. No.: 16/912,105

(22) Filed: Jun. 25, 2020

(65) Prior Publication Data

US 2021/0065381 A1 Mar. 4, 2021

(30) Foreign Application Priority Data

Aug. 29, 2019 (CN) .......................... 201910805805.6

(51) Int. Cl.
*G06T 7/246* (2017.01)
*G06T 7/73* (2017.01)

(52) U.S. Cl.
CPC ................ *G06T 7/246* (2017.01); *G06T 7/73* (2017.01); *G06T 2207/10016* (2013.01); *G06T 2207/30241* (2013.01)

(58) Field of Classification Search
CPC ........... G06T 7/20; G06T 7/246; G06T 7/292; G06T 7/70; G06T 7/73; G06T 7/97;
(Continued)

(56) References Cited

U.S. PATENT DOCUMENTS 8,229,164 B2 7/2012 Miyamoto et al.
2007/0183629 A1* 8/2007 Porikli et al. ........... G06T 7/251
382/103
(Continued)

FOREIGN PATENT DOCUMENTS

CN 103914685 A 7/2014
CN 104462550 A 3/2015
(Continued)

OTHER PUBLICATIONS

Machine translation of CN 10862791 A, Oct. 9, 2018.*
(Continued)

*Primary Examiner* — Andrew W Johns
(74) *Attorney, Agent, or Firm* — Dinsmore & Shohl LLP

(57) ABSTRACT

The present disclosure relates to a target tracking method, device, system, and non-transitory computer readable storage medium. The method includes: performing target detection on a current frame image to determine an area where a current target is located; extracting a current feature vector and a current position information of the area where the current target is located; acquiring a historical feature vector and a historical position information of an area where each historical target is located in one or more historical frame images; determining a position difference between the current target and the each historical target according to the current position information and each historical position information; determining a feature difference between the current target and the each historical target according to the current feature vector and each historical feature vector; and determining a historical target that is the same target as the current target.

14 Claims, 10 Drawing Sheets

(58) Field of Classification Search
CPC . G06T 2207/30196; G06T 2207/30232; G06T 2207/30241; G06K 9/00624; G06K 9/00771; G06K 9/4604; G06K 9/4609; G06K 9/6202; G06K 9/6215; G06V 10/44; G06V 10/443; G06V 10/751; G06V 10/761; G06V 20/50; G06V 20/52
See application file for complete search history.

(56) References Cited

U.S. PATENT DOCUMENTS

| | | | |
|---|---|---|---|
| 2010/0002908 A1 | 1/2010 | Miyamoto et al. | |
| 2012/0014562 A1* | 1/2012 | Berkovich et al. | G06K 9/00228 382/103 |
| 2017/0011520 A1* | 1/2017 | Mathew et al. | G06K 9/6232 |
| 2019/0163982 A1* | 5/2019 | Block | G06N 5/022 |

FOREIGN PATENT DOCUMENTS

| | | | | |
|---|---|---|---|---|
| CN | 107563313 A | 1/2018 | | |
| CN | 107992827 A | 5/2018 | | |
| CN | 108388879 A | 8/2018 | | |
| CN | 108629791 A | 10/2018 | | |
| CN | 108924507 A | 11/2018 | | |
| CN | 109165612 A | 1/2019 | | |
| CN | 109190444 A * | 1/2019 | | G06N 3/08 |
| CN | 109754409 A | 5/2019 | | |
| CN | 109816690 A | 5/2019 | | |
| CN | 109816701 A | 5/2019 | | |
| CN | 110059521 A | 7/2019 | | |

OTHER PUBLICATIONS

Chinese Office Action dated Aug. 17, 2021 relating to CN Patent Application No. 201910805805.6.

Zhong et al., "Re-Ranking Person Re-Identification with k-reciprocal Encoding", Cognitive Science Department, Xiamen Unviersity, China, University of Technology, Sydney. Jan. 2017, pp. 1-11. (URL: https://www.researchgate.net/publication/313097662).

Zhang, et al., "Person Re-Identification via Multiple Confidences Re-Ranking", Faculty of Automation and Information Engineering, Xi' an University of Technology, Xi' an 710048, 8 pages.

* cited by examiner

TARGET TRACKING METHOD, DEVICE, SYSTEM AND NON-TRANSITORY COMPUTER READABLE MEDIUM

CROSS-REFERENCE TO RELATED APPLICATIONS

The present application is based on the application with a CN application number of 201910805805.6 and the filing date being Aug. 29, 2019, and claims its priority. The disclosure of this CN application as a whole is incorporated into the present application herein by reference.

TECHNICAL FIELD

The present disclosure relates to the field of artificial intelligence technology, and in particular, to a target tracking method, a target tracking device, a target tracking system, and a non-transitory computer readable storage medium.

BACKGROUND

By using computer vision technology, a human body in the image obtained from the camera can be detected. By contextually associating the pedestrians in each frame image, it can be determined the detection result of which pedestrian in the historical frame image corresponds to the pedestrian in the present frame image, and then continuous pedestrian trajectories can be obtained to realize pedestrian trajectory tracking.

In the related art, a historical trajectory is matched with the detection result of a current position of the image, thereby forming a tracking trajectory.

SUMMARY

According to some embodiments of the present disclosure, there is provided a target tracking method comprising: performing target detection on a current frame image to determine an area where a current target is located; extracting a current feature vector and a current position information of the area where the current target is located; acquiring a historical feature vector and a historical position information of an area where each historical target is located in one or more historical frame images; determining a position difference between the current target and the each historical target according to the current position information and each historical position information; determining a feature difference between the current target and the each historical target according to the current feature vector and each historical feature vector; and determining a historical target that is the same target as the current target according to the feature difference and the position difference, and tracking the current target.

In some embodiments, the tracking the current target comprises: updating a trajectory of the historical target according to the current position information to form a tracking trajectory of the current target.

In some embodiments, the target tracking method further comprises: acquiring a first tracking trajectory formed according to frame images shot by a first image sensor; acquiring a second tracking trajectory formed according to frame images shot by a second image sensor; calculating a distance between trajectory points of the first tracking trajectory and the second tracking trajectory at same moments; determining whether the first tracking trajectory and the second tracking trajectory belong to the same target according to the distance between the trajectory points; and fusing the first tracking trajectory and the second tracking trajectory into one tracking trajectory if the first tracking trajectory and the second tracking trajectory belong to the same target.

In some embodiments, the target tracking method further comprises: when it cannot be determined which historical target is the same target as the current target according to the feature difference and the position difference, calculating an overlapping area of the area where the current target is located and the area where each historical target is located and determining the current target as a new target different from the each historical target and as a starting point of a tracking trajectory if the overlapping area is smaller than a threshold; or determining position information of the current target at one or more historical moments by using an interpolation method according to the position information of the area where the current target is located, and updating a tracking trajectory of the current target according to the position information of the current target at one or more historical moments.

In some embodiments, determining a feature difference between the current target and the each historical target comprises:

calculating a distance between the current feature vector and the each historical feature vector; forming a current similar feature set of the current feature vector by using a plurality of historical feature vectors which are closest to the current feature vector; calculating a distance between the each historical feature vector in the current similar feature set and other historical feature vectors in the current similar feature set, and a distance between the each historical feature vector and the current feature vector; determining a plurality of feature vectors which are closest to the each historical feature vector from the other historical feature vectors and the current feature vector to form a historical similar feature set of the each historical feature vector; determining a weight of the each historical target to the current target according to the current similar feature set and each historical similar feature set; and determining the feature difference according to the weight.

In some embodiments, determining a weight of the each historical target to the current feature vector comprises: determining whether a historical feature vector belongs to the current similar feature set; in the case where the historical feature vector belongs to the current similar feature set, determining whether the current feature vector belongs to the historical similar feature set of the historical feature vector; in the case where the current feature vector belongs to the historical similar feature set of the historical feature vector, determining the historical feature vector as a candidate historical feature vector; forming a first candidate historical feature vector set by using each candidate historical feature vector; and determining the weight according to the first candidate historical feature vector set.

In some embodiments, the first candidate historical feature vector set comprises a first historical feature vector and a second historical feature vector.

In some embodiments, said determining the weight according to the first candidate historical feature vector set comprises: determining whether the first historical feature vector belongs to the historical similar feature set of the second historical feature vector; and if so, determining whether the second historical feature vector belongs to the historical similar feature set of the first historical feature vector; if so, determining the second historical feature vector as a nearest neighbor historical feature vector of the first historical feature vector; forming a nearest neighbor feature vector set of each historical feature vector by using each nearest neighbor historical feature vector of each historical feature vector; determining a second candidate historical feature vector set according to a nearest neighbor feature vector set of each candidate historical feature vector and the first candidate historical feature vector set; and determining the weight according to the second candidate historical feature vector set.

In some embodiments, determining a second candidate historical feature vector set comprises: determining the second candidate historical feature vector set according to a union of the nearest neighbor feature vector set of each candidate historical feature vector and the first candidate historical feature vector set.

In some embodiments, said determining the weight according to the second candidate historical feature vector set comprises: in the case where the historical feature vector does not belong to the second candidate historical feature vector set, determining a weight of a corresponding historical target of a historical feature vector to be 0; in the case where the historical target feature vector belongs to the second candidate historical feature vector set, negatively correlating the weight of the corresponding historical target of the historical feature vector and a distance between the current feature vector and the historical feature vector.

In some embodiments, the target tracking method further comprises: determining position information of the current target at a historical time by using an interpolation method according to the position information of the area where the current target is located, for updating a tracking trajectory of the current target.

In some embodiments, determining a position difference between the current target and said each historical target comprises: predicting position information of an area wherein said each historical target is located at a corresponding moment of the current frame image by using nonlinear filtering according to each historical position information; and determining the position difference according to the current position information and the predicted position information.

In some embodiments, said determining a historical target that is the same target as the current target according to the feature difference and the position difference comprises: when the position difference between the current target and the historical target is greater than a difference threshold, determining that the current target and the historical target are not the same target; and when the position difference between the current target and the historical target is smaller than or equal to the difference threshold, determining whether the current target and the historical target are the same target according to the feature difference between the current target and the historical target.

According to further embodiments of the present disclosure, there is provided a target tracking device, comprising one or more processors configured to: perform target detection on a current frame image to determine an area where a current target is located; extract a current feature vector and a current position information of the area where the current target is located; acquire a historical feature vector and a historical position information of an area where each historical target is located in one or more historical frame images; determine a position difference between the current target and the each historical target according to the current position information and each historical position information; determine a feature difference between the current target and the each historical target according to the current feature vector and each historical feature vector; and determine a historical target that is the same target as the current target according to the feature difference and the position difference, and tracking the current target.

In some embodiments, the tracking the current target comprises: updating a trajectory of the historical target according to the current position information to form a tracking trajectory of the current target.

In some embodiments, the processor is further configured to: acquire a first tracking trajectory formed according to frame images shot by a first image sensor; acquire a second tracking trajectory formed according to frame images shot by a second image sensor; calculate a distance between trajectory points of the first tracking trajectory and the second tracking trajectory at same moments; determine whether the first tracking trajectory and the second tracking trajectory belong to the same target according to the distance between the trajectory points; and fuse the first tracking trajectory and the second tracking trajectory into one tracking trajectory if the first tracking trajectory and the second tracking trajectory belong to the same target.

In some embodiments, the processor is further configured to: when it cannot be determined which historical target is the same target as the current target according to the feature difference and the position difference, calculating an overlapping area of the area where the current target is located and the area where each historical target is located and determining the current target as a new target different from the each historical target and as a starting point of a tracking trajectory if the overlapping area is smaller than a threshold; or determining position information of the current target at one or more historical moments by using an interpolation method according to the position information of the area where the current target is located, and updating a tracking trajectory of the current target according to the position information of the current target at one or more historical moments.

In some embodiments, determining a feature difference between the current target and the each historical target comprises: calculating a distance between the current feature vector and the each historical feature vector; forming a current similar feature set of the current feature vector by using a plurality of historical feature vectors which are closest to the current feature vector; calculating a distance between the each historical feature vector in the current similar feature set and other historical feature vectors in the current similar feature set, and a distance between the each historical feature vector and the current feature vector; determining a plurality of feature vectors which are closest to the each historical feature vector from the other historical feature vectors and the current feature vector to form a historical similar feature set of the each historical feature vector; determining a weight of the each historical target to the current target according to the current similar feature set and each historical similar feature set; and determining the feature difference according to the weight.

In some embodiments, the processor is further configured to: determine position information of the current target at a historical time by using an interpolation method according to the position information of the area where the current target is located, for updating a tracking trajectory of the current target.

In some embodiments, determining a position difference between the current target and the each historical target comprises: predicting position information of the area wherein the each historical target is located at a corresponding moment of the current frame image by using nonlinear filtering according to the each historical position information; and determining the position difference according to the current position information and the predicted position information.

According to still further embodiments of the present disclosure, there is provided a target tracking device, comprising: a memory; and a processor coupled to the memory, the processor configured to perform the target tracking method of any of the above embodiments based on instructions stored in the memory device.

According to still further embodiments of the present disclosure, there is provided a non-transitory computer readable storage medium having stored thereon a computer program which, when executed by a processor, implements the target tracking method as described in any of the above embodiments.

According to still further embodiments of the present disclosure, there is provided a target tracking system comprising the target tracking device in any of the above embodiments.

In some embodiments, the target tracking system further comprises: an image sensor for acquiring a frame image containing a target.

Other features and advantages of the present disclosure will become clear through detailed descriptions of the illustrative embodiments of the present disclosure with reference to the following accompanying drawings.

BRIEF DESCRIPTION OF THE DRAWINGS

The accompanying drawings that form a part of the description describe the embodiments of the present disclosure, and are used to explain the principle of the present disclosure together with the description.

The present disclosure can be comprehended more clearly with reference to the accompanying drawings and according to the following detailed descriptions, wherein.

It shall be understood that the various parts shown in the accompanying drawings are not drawn in sizes according to actual proportional relations. In addition, the same or similar reference numerals indicate the same or similar components.

DETAILED DESCRIPTION

Various illustrative embodiments of the present disclosure will now be described in details with reference to the accompanying drawings. The descriptions of the illustrative embodiments are only illustrative, but shall not serve as limitations on the present disclosure and its application or utilization. The present disclosure can be implemented in many different forms and is not limited to the embodiments described herein. These embodiments are provided to make the present disclosure thorough and complete, and to fully express the scope of the present disclosure to those skilled in the art. It should be noted that unless otherwise illustrated, the relative arrangements of the components and steps set forth in these embodiments are to be construed as illustrative only and not as a limitation.

All terms (including technical or scientific terms) used in the present disclosure have the same meaning as those understood by one ordinary skilled in the art to which the present disclosure belongs, unless specifically defined otherwise. It shall be further understood that, the terms as defined in a common dictionary shall be interpreted as having meanings consistent with those in the context of the relevant technique, instead of being interpreted with an idealistic or extremely formalized meaning, unless it is explicitly defined here.

Techniques, methods and devices that have already been known to ordinary skilled in the art may not be discussed here in details, but under suitable circumstances, the techniques, methods and devices shall be deemed as parts of the description.

Figure 1:
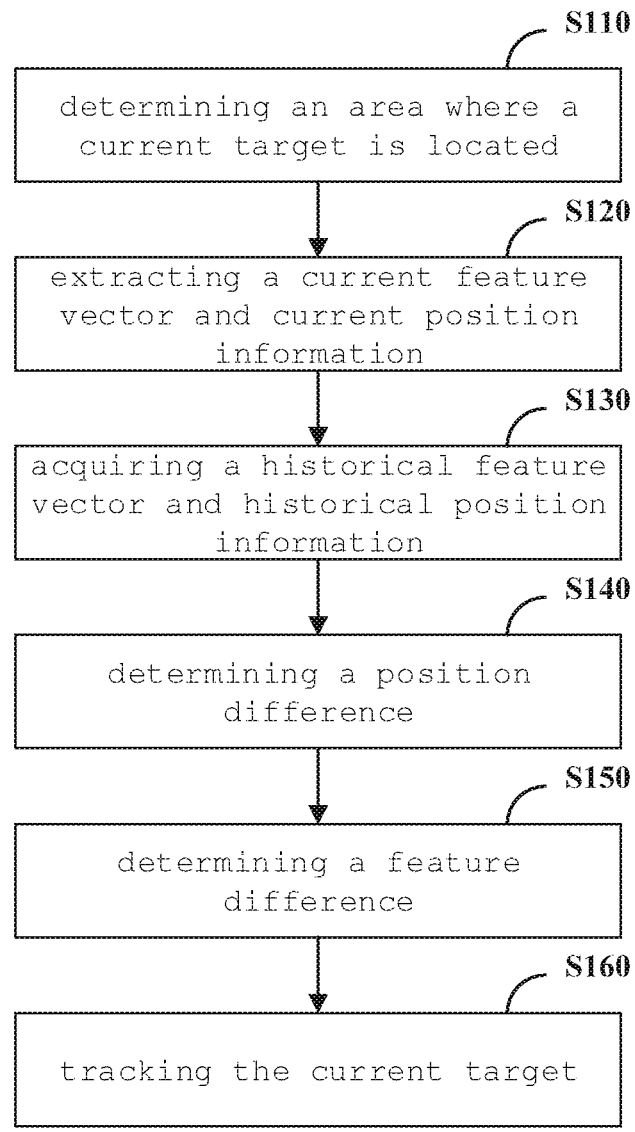
FIG. 1 shows a flowchart of a target tracking method according to one embodiment of the present disclosure.

FIG. 1 shows a flowchart of a target tracking method according to one embodiment of the present disclosure.

As shown in FIG. 1, the method comprises: step S110, determining an area where a current target is located; step S120, extracting a current feature vector and current position information; step S130, acquiring a historical feature vector and historical position information; step S140, determining a position difference; step S150, determining a feature difference; and step S160, tracking the current target.

In step S110, target detection is performed on the current frame image to determine an area where the current target is located.

In some embodiments, a single-stage deep learning detection model with excellent real-time performance and accuracy can be used for performing target detection on the current frame image, such as a YOLO (You Only Look Once) v3 model. For example, the current frame image may be scaled to an image of 416×416 size to be input into the YOLO v3 model. After non-maximum suppression, the predicted probability that a target in the current frame image is a "person" and a position of the corresponding frame can be obtained.

In step S120, a current feature vector and current position information of an area where the current target is located are extracted. For example, in the case where the target is determined to be a "person", the position of the corresponding frame may be used as the current position information.

In some embodiments, an area where the current target (e.g., a pedestrian) is located in the frame image may be determined by a target detection method. For example, the area may be an image within a rectangular box, and there can be multiple targets in the frame image, so there are multiple boxes. The current location information may be location information (u, v, y, h) of the box. u and v are the horizontal and vertical coordinates of the center position of the box, y is the aspect ratio of the box, and h is the height of the box.

In some embodiments, an image containing only a target (e.g., a pedestrian) (e.g., an image in a frame containing the pedestrian in the current frame image) may be input into a machine learning model, and a feature vector (e.g., 128 dimensions, etc.) of the target may be output as the current feature vector. For example, the current feature vector may be extracted by the embodiment in FIG. 2.

Figure 2:
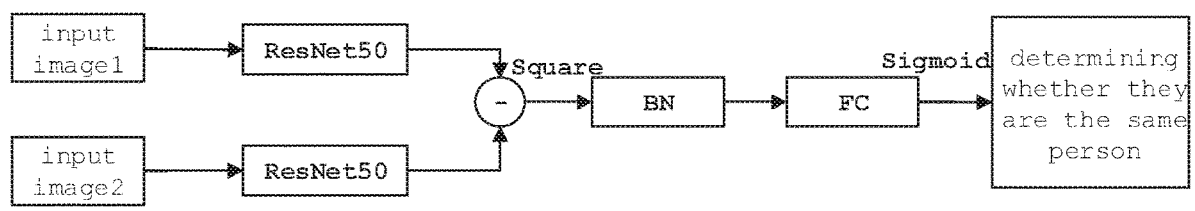
FIG. 2 shows a schematic diagram of a feature vector extraction model according to one embodiment of the present disclosure.

FIG. 2 shows a schematic diagram of a feature vector extraction model according to one embodiment of the present disclosure.

As shown in FIG. 2, the feature vector extraction model comprises a backbone network (such as a ResNet50 model) for extracting feature vectors, a BN (Batch Normalization) layer, an FC (Fully Connected layers) layer.

In some embodiments, in the process of training the feature vector extraction model, the input training samples may be picture 1 and picture 2 containing a "person"; after the picture 1 and the picture 2 are respectively subjected to feature extraction through ResNet50, respective feature vectors can be obtained; a square of the difference of the two feature vectors is input into the BN layer and the FC layer for processing, and then processed by a Sigmoid function to obtain a probability that the "person" in the picture 1 and the "person" in the picture 2 are the same person; and the feature vector extraction model is trained according to the labeling condition of the "person" in the pictures 1 and 2 by combining the obtained probability.

For example, in the training process, a large number of positive and negative samples may be used for training. By inputting a frame image to be processed into the trained model, a feature vector of the pedestrian in the frame image can be obtained.

After extracting the feature vector and position information of the current target, the remaining steps in FIG. 1 may be used for target tracking.

In step S130, a historical feature vector and historical position information of an area where each historical target is located in the historical frame image are acquired. For example, a feature vector of a target in an image of a frame or frames before the current frame image may be acquired as a historical feature vector, and position information of the target in the image of the frame or frames before may be acquired as the historical position information.

In step S140, a position difference between the current target and each historical target is determined based on the current position information and each historical position information. For example, the position difference may be determined from a coordinate difference between the historical position information and the current position information.

Figure 3:
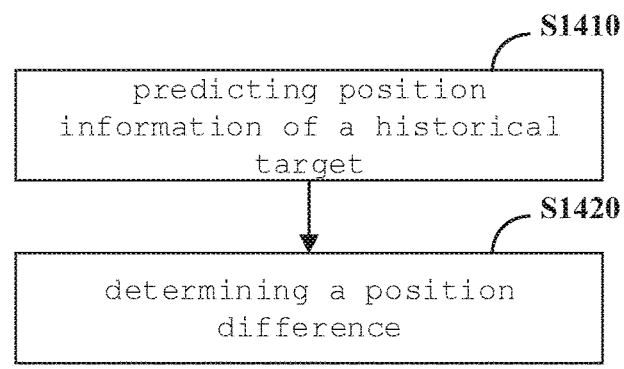
FIG. 3 shows a flowchart of step S140 according to one embodiment of FIG. 1.

In some embodiments, step S140 may be implemented using the embodiment in FIG. 3.

FIG. 3 shows a flowchart of step S140 according to one embodiment of FIG. 1.

As shown in FIG. 3, step S140 includes: step S1410, predicting position information of a historical target; and step S1420, determining a position difference.

In step S1410, position information of an area where each historical target is located at the current frame time is predicted by nonlinear filtering according to each historical position information.

In some embodiments, a trajectory of a historical target may be tracked and predicted. For example, the state variables of the history target may be determined to be a 8-dimensional vector (u, v, y, h, u̇, v̇, ẏ, ḣ), and u̇, v̇, ẏ and ḣ are rates of change of u, v, y and h, respectively; the state variables may be processed using a nonlinear filtering method (e.g., a Kalman filtering method) so as to predict position information of the historical target at the current frame moment.

In step S1420, a position difference is determined based on the current position information and the predicted position information.

In some embodiments, a Mahalanobis distance between the position information of the box in the target detection results (detections) of the current frame image and the position information predicted by a Kalman filter can be calculated:

$$d_p = (de-pr)^T S^{-1}(de-pr)$$

de is the position information of a certain box in the current frame image, pr is the position information of a target predicted by a certain filter, and S is a covariance matrix between the current position information and the predicted position information. For example, if the distance is greater than a certain threshold, the distance may be set to infinity, i.e., it is determined that the current target is located far from the historical target.

After the position difference is determined, the remaining steps in FIG. 1 may be used for target tracking.

In step S150, a feature difference between the current target and each historical target is determined according to the current feature vector and each historical feature vector. For example, a cosine distance of the current feature vector from each historical feature vector may be calculated as the feature difference. Step S150 and step S140 have no execution order.

In some embodiments, a re-rank distance between the current feature vector and each historical feature vector may be calculated as the feature difference. For example, the embodiment in FIG. 4 can be used to implement the steps S150.

Figure 4:
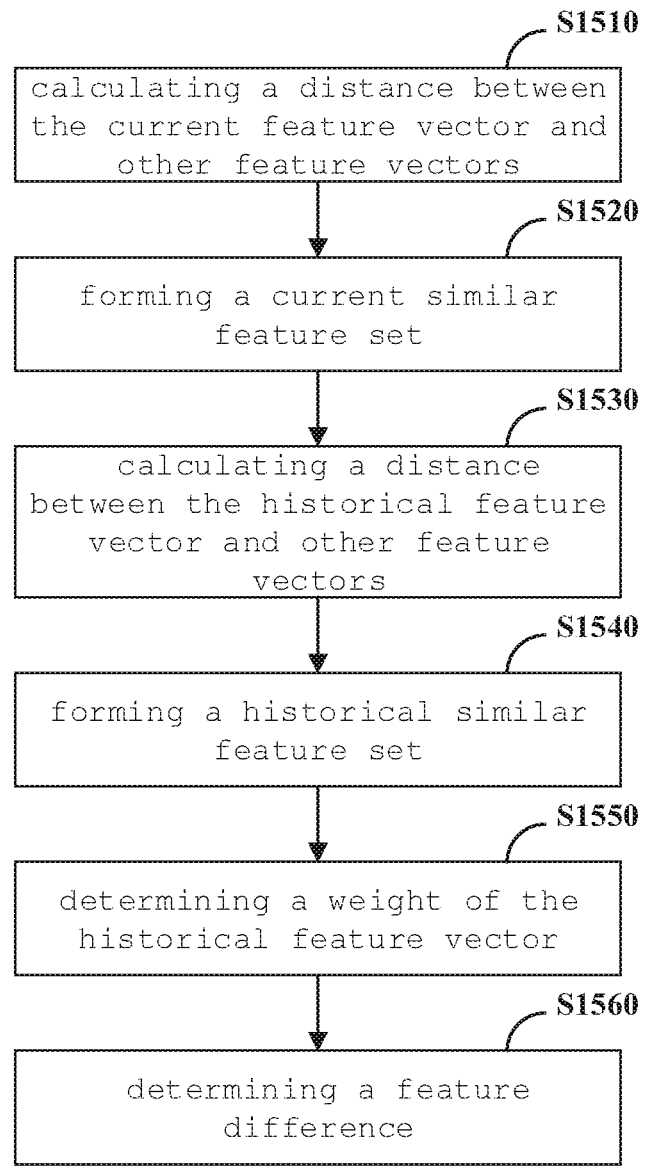
FIG. 4 shows a flowchart of step S150 according to one embodiment of FIG. 1.

FIG. 4 shows a flowchart of step S150 according to one embodiment of FIG. 1.

As shown in FIG. 4, step S150 includes: step S1510, calculating a distance between the current feature vector and other feature vectors; step S1520, forming a current similar feature set; step S1530, calculating a distance between the historical feature vector and other feature vectors; step S1540, forming a historical similar feature set; step S1550, determining a weight of the historical feature vector; and step S1560, determining a feature difference.

In step S1510, a distance between the current feature vector and each historical feature vector is calculated. For example, a cosine distance between the current feature vector and each historical feature vector may be calculated.

In step S1520, a current similar feature set of the current feature vector is formed using a plurality of historical feature vectors that are closest to the current feature vector.

In some embodiments, each target detection result of the current frame image may be processed, where a current feature vector of one target detection result is fd. The current similar feature set of fd may be calculated. For example, cosine distances of fd from historical feature vectors $fh_n$ of all historical targets (Gallery) can be calculated:

$$dC_n(fd,fh_n)=1-\text{dot}(fd,fh_n)$$

There are N historical targets (i.e., N historical trajectories), where N is an integer greater than or equal to 1, and n is a positive integer less than or equal to N, so that N cosine distances can be obtained. dot(•) is a dot product of two vectors.

The N cosine distances may be sorted from small to large to obtain a set of historical feature vectors of the top K historical targets (K is a positive integer, and k is a positive integer smaller than K) as a current similar feature set:

$$Ne(fd,K)=\{fh_1, fh_2, \ldots, fh_k, \ldots, fh_K\}$$

In step S1530, a distance between a historical feature vector in the current similar feature set and other historical feature vectors in the current similar feature set, and a distance between the historical feature vector and the current feature vector are calculated.

In step S1540, a plurality of feature vectors closest to the historical feature vector are determined from the other historical feature vectors and the current feature vector to form a historical similar feature set of the historical feature vector.

A historical similar feature set Ne(fd,K) of each historical feature vector $fh_k$ in Ne($fh_k$,K) can be determined through step S1530 and step S1540. Ne($fh_k$,K) includes Kfeature vectors having the smallest distance to $fh_k$, and the K feature vectors may include the current feature vector fd.

In step S1550, a weight of each historical target to the current target is determined according to the current similar feature set and each historical similar feature set. For example, if the historical feature vector belongs to the current similar feature set of the current feature vector and the current feature vector belongs to the historical similar feature set of the historical feature vector, the weight of the historical feature vector is greater than the weight of the historical feature vector which does not meet the above condition.

In step S1560, a feature difference is determined according to the weight. For example, the feature difference between the historical feature vector and the current feature vector may be set to be negatively correlated to the corresponding weight.

Figure 5:
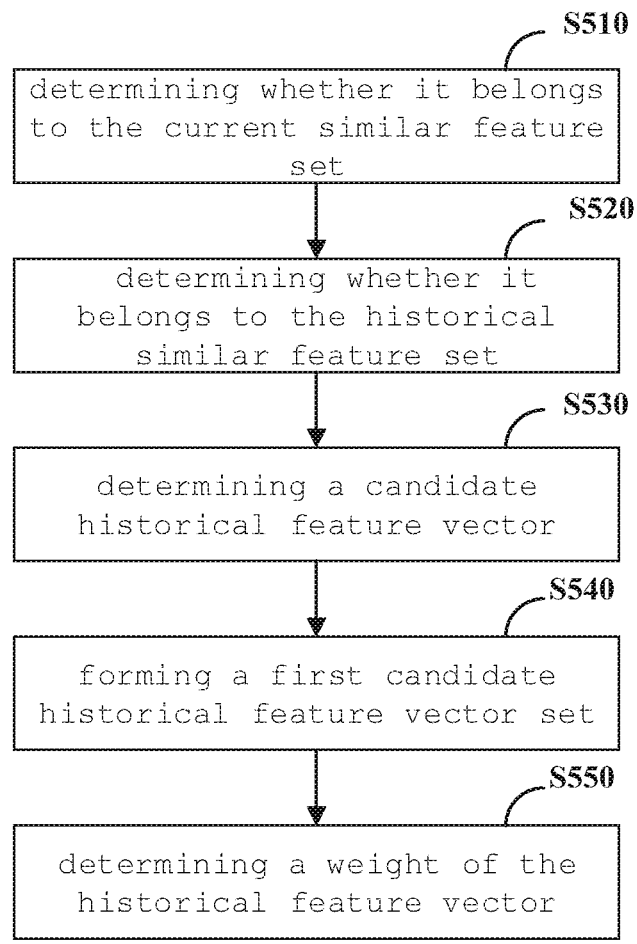
FIG. 5 shows a flowchart of step S1550 according to one embodiment of FIG. 4.

In some embodiments, step S1550 may be implemented using the embodiment of FIG. 5.

FIG. 5 shows a flowchart of step S1550 according to one embodiment of FIG. 4.

As shown in FIG. 5, step S1550 includes: step S510, determining whether it belongs to the current similar feature set; step S520, determining whether it belongs to the historical similar feature set; step S530, determining a candidate historical feature vector; step S540, forming a first candidate historical feature vector set; and step S550, determining a weight of the historical feature vector.

In step S510, it is determined whether the historical feature vector belongs to the current similar feature set.

In step S520, in the case where the historical feature vector belongs to the current similar feature set, it is determined whether the current feature vector belongs to the historical similar feature set of the historical feature vector.

In step S530, in the case where the current feature vector belongs to the historical similar feature set of the historical feature vector, the historical feature vector is determined as a candidate historical feature vector.

In step S540, a first candidate historical feature vector set is formed using the candidate historical feature vectors.

In some embodiments, a K-Nearest Neighbor (K-NN, K-Nearest Neighbor) of the current feature vector fd may be calculated as a first candidate historical feature vector set:

$$R(fd,K)=\{fh_k|fh_k\in Ne(fd,K) \boxplus fd\in Ne(fh_k,K)\}$$

In step S550, a weight is determined according to the first candidate historical feature vector set. For example, if the historical feature vector belongs to R(fd,K), a weight of the historical feature vector is greater than a weight of a historical feature vector that does not belong to R(fd,K).

In some embodiments, the first candidate historical feature vector set may be expanded according to the K'-Nearest Neighbor of the historical feature vector belonging to the first candidate historical feature vector set, K' may be a positive integer less than K (e.g., K is even, K'=K/2). For example, step S550 can be implemented by the embodiment in FIG. 6.

Figure 6:
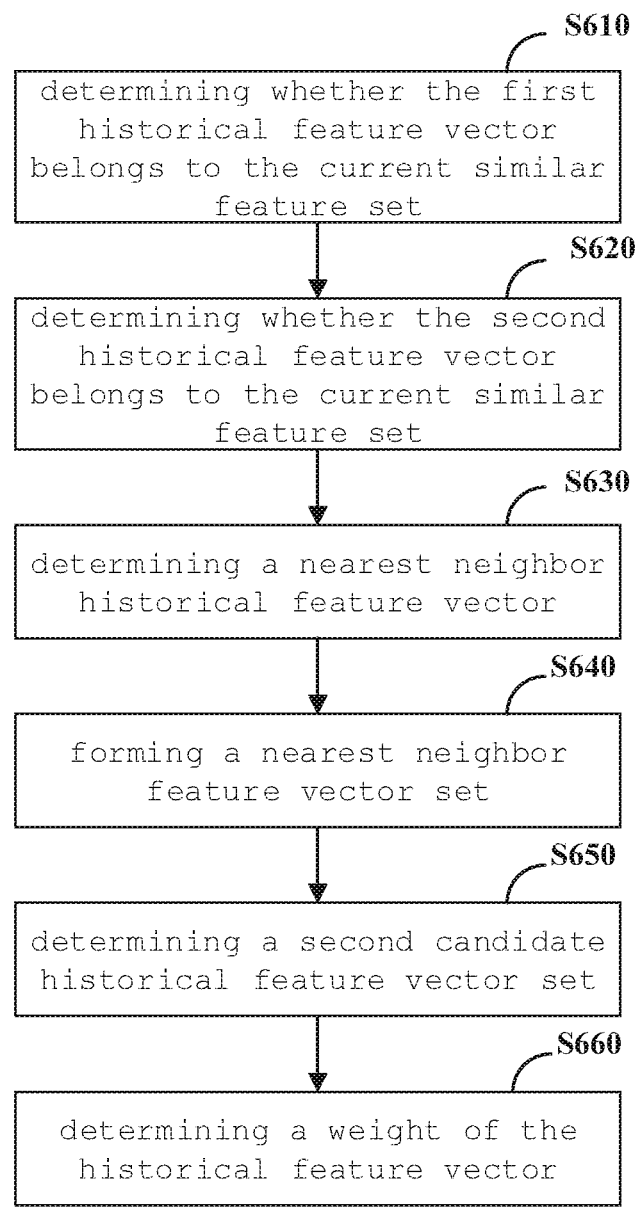
FIG. 6 shows a flowchart of step S550 according to one embodiment of FIG. 5.

FIG. 6 shows a flowchart of step S550 according to one embodiment of FIG. 5.

As shown in FIG. 6, step S550 includes: step S610, determining whether the first historical feature vector belongs to the current similar feature set; step S620, determining whether the second historical feature vector belongs to the current similar feature set; step S630, determining a nearest neighbor historical feature vector; step S640, forming a nearest neighbor feature vector set; step S650, determining a second candidate historical feature vector set; and step S660, determining a weight of the historical feature vector.

In step S610, the first candidate historical feature vector set includes a first historical feature vector and a second historical feature vector, and it is determined whether the first historical feature vector belongs to a historical similar feature set of the second historical feature vector. For example, the historical similar feature set of the second historical feature vector comprises K' feature vectors with the shortest distance from the second historical feature vector.

In step S620, in the case where the first historical feature vector belongs to the historical similar feature set of the second historical feature vector, it is determined whether the second historical feature vector belongs to the historical similar feature set of the first historical feature vector. For example, the historical similar feature set of the first historical feature vector comprises K' feature vectors with the shortest distance from the first historical feature vector.

In step S630, in the case where the second historical feature vector belongs to the historical similar feature set of the first historical feature vector, the second historical feature vector is determined as a nearest neighbor historical feature vector of the first historical feature vector.

In step S640, a nearest neighbor feature vector set of the historical feature vector is formed using each nearest neighbor historical feature vector of the historical feature vector. For example, K'-Nearest Neighbors of all historical feature vectors $fh_k$ in R(fd,K) can be determined as the nearest neighbor feature vector set R($fh_k$,K').

In step S650, a second candidate historical feature vector set is determined according to the nearest neighbor feature vector set of each candidate historical feature vector and the first candidate historical feature vector set.

In some embodiments, the second candidate historical feature vector set is determined according to a union of the nearest neighbor feature vector set of each candidate historical feature vector and the first candidate historical feature vector set.

In some embodiments, the first candidate historical feature vector set comprises at least one first candidate historical feature vector; the first candidate historical feature vector is determined as a second candidate historical feature vector in the case where the number of elements in an intersection of the nearest neighbor feature vector set of the first candidate historical feature vector and the first candidate historical feature vector set is greater than or equal to a product of a control coefficient and the number of elements in the nearest neighbor feature vector set of the first candidate historical feature vector; a second candidate historical feature vector set is formed according to a union of the nearest neighbor feature vector set of each second candidate historical feature vector and the first candidate historical feature vector set.

For example, a second candidate historical feature vector set R'(fd,K) is determined from a union of R(fd,K) and each R(fh$_k$,K') satisfying the following constraint:

$$|R(fd,K) \cap R(fh_k,K')| \geq C|R(fh_k,K')|, \forall fh_k \in R(fh_k,K')$$

C is a control coefficient greater than zero and equal to or less than 1, for example, C may be ⅔, and 1.1 represents the number of elements in the set.

In step S660, a weight is determined according to the second candidate historical feature vector set. For example, if the historical feature vector belongs to R'(fd,K), the weight of the historical feature vector is greater than a weight of a historical feature vector that does not belong to R'(fd,K).

In some embodiments, in the case where the historical feature vector does not belong to the second candidate historical feature vector set, a weight of a corresponding historical target of the historical feature vector is determined to be 0; in the case where the historical target feature vector belongs to the second candidate historical feature vector set, the weight of the corresponding historical target of the historical feature vector and a distance between the current feature vector and the historical feature vector are negatively correlated.

In some embodiments, encoding process (setting a weight) may be performed based on all the historical feature vectors of the second candidate historical feature vector set R'(fd,K). The weight set of each historical feature vector is $W_{fd} = [w_{fd,fh_1}, w_{fd,fh_2}, \ldots w_{fd,fh_n}, w_{fd,fh_N}], w_{fd,fh_n}$ is:

$$w_{fd,fh_n} = \begin{cases} 1 & fh_k \in R'(fd, K) \\ 0 & others \end{cases}$$

In some embodiments, weights may be assigned according to $dc_n(fd, fh_n)$. For example, a weight of the historical feature vector $fh_n$ to the current feature vector fd is:

$$w_{fd,fh_n} = \begin{cases} e^{-dc_n(fd,fh_n)} & fh_n \in R'(fd, K) \\ 0 & others \end{cases}$$

In some embodiments, a feature difference may be determined according to the weight. For example, a Jaccard distance between fd and $fh_n$ is calculated according to the weight of historical feature vector $fh_n$:

$$dJ_n(fd, fh_n) = 1 - \frac{\sum_{n=1}^{N} \min(w_{fd,fh_n}, w_{fh_m,fh_n})}{\sum_{n=1}^{N} \max(w_{fd,fh_n}, w_{fh_m,fh_n})}$$

m is a positive integer less than N. $w_{fh_m,fh_n}$ is a weight of the historical feature vector $fh_m$ to the current feature vector $fh_n$:

$$w_{fh_m,fh_n} = \begin{cases} e^{-dc_n(fh_n,f h_n)} & fh_m \in R'(fh_n, K) \\ 0 & others \end{cases}$$

R'($fh_n$,K) is the nearest neighbor feature vector set of $fh_n$, and R'(fd,K) can be calculated according to the method of calculating R'(fd,K) in any of the above embodiments (i.e., replacing fd in the above embodiments with $fh_n$, and replacing $fh_n$ with $fh_m$).

In some embodiments, the feature difference between fd and $fh_n$ can be calculated according to the following equation:

$$d(fd,fh_n) = (1-\alpha)dJ_n(fd,fh_n) + \alpha dC_n(fd,fh_n)$$

$\alpha \in [0,1]$, a can be specified empirically, e.g., $\alpha=0.5$.

In the above embodiments, the current target and the historical target are reordered and allocated according to the re-rank distance, which improves the accuracy of matching, thereby improving the accuracy of target tracking. After the feature difference and the position difference are determined, the current target may be tracked through step S160 in FIG. 1.

In step S160, a historical target that is the same target as the current target is determined according to the feature difference and the position difference, so as to track the current target.

In some embodiments, if the position difference is greater than a threshold, it may be determined that the current target is not the same target as the historical target; if the position difference is less than or equal to the threshold, it may be determined whether the current target and the historical target are the same target according to the feature difference. For example, feature difference d(fd,$fh_n$) may be determined by any of the above embodiments, and in the case where the feature difference is larger than a feature threshold, the current target and the corresponding historical target are determined to be the same target; and in the case where the feature difference is less than or equal to the feature threshold, the targets are determined to be different targets.

In some embodiments, d(fd,$fh_n$) may also be used as a cost function, and the Hungarian algorithm is used to match the current target with each historical target (to get matched indices) to determine a historical target that is the same target as the current target, so as to track the current target. For example, the historical feature vector and historical position information in the tracker are updated with the current feature vector and current position information of the current detection.

In the above embodiment, the current target and the historical target are first matched by the position difference, and then the current target and the historical target are matched by the feature difference in the case of a small position difference. In this way, the problem of misrecognition caused by the occlusion of the target in the frame image (different target positions are close to each other) can be avoided, thereby improving the accuracy of target tracking.

Figure 7:
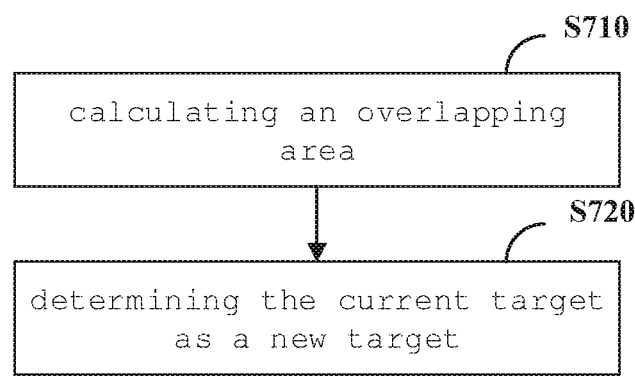
FIG. 7 shows a flowchart of a target tracking method according to another embodiment of the present disclosure.

In some embodiments, in the case where it cannot be determined which historical target is the same target as the current target according to the feature difference and the position difference, it may be determined according to the embodiment in FIG. 7 which historical target is the same target as the current target.

FIG. 7 shows a flowchart of a target tracking method according to another embodiment of the present disclosure.

As shown in FIG. 7, the method includes: step S710, calculating an overlapping area; and step S720, determining the current target as a new target.

In step S710, an overlapping area of the area where the current target is located and the area where the historical target is located is calculated.

In step S720, when the overlapping area is smaller than a threshold, the current target is determined as a new target different from each historical target and as a starting point of the tracking trajectory.

In some embodiments, in the case where there is no historical target that successfully matches the current target, it may be determined according to the confirm policy whether a new identification is assigned to the current target (determined to be a new target). For example, a new ID (identification) is only assigned if the constraint requirements of the confirm policy are met, otherwise it is not assigned. This can prevent the ID from increasing too fast due to detection errors caused by occlusion, thereby avoiding the problem of false high number of people.

In some embodiments, an IOU (Interaction over Union, overlapping area) of positions of the current target and all the historical targets that are not successfully matched in the tracker is calculated, and when the IOU is greater than an overlapping threshold, it may be determined that the current target is a new target, and a new ID is assigned to it; otherwise, no new ID is assigned, if the target cannot be successfully matched with the historical target in the subsequent consecutive multiple frame images, the target is determined to be a new target, and a new ID is assigned to the target. For example, the IOU of an area $S_{t1}$ of the box where the current target is located and an area $S_{t2}$ of the box where the historical target is located is:

$$IOU = \frac{S_{t1} \cap S_{t2}}{S_{t1} \cup S_{t2}}$$

In some embodiments, coordinates of each trajectory point in the tracking trajectory may be transformed to determine coordinates in a world coordinate system. This may be achieved, for example, by the embodiment of FIG. 8.

Figure 8:
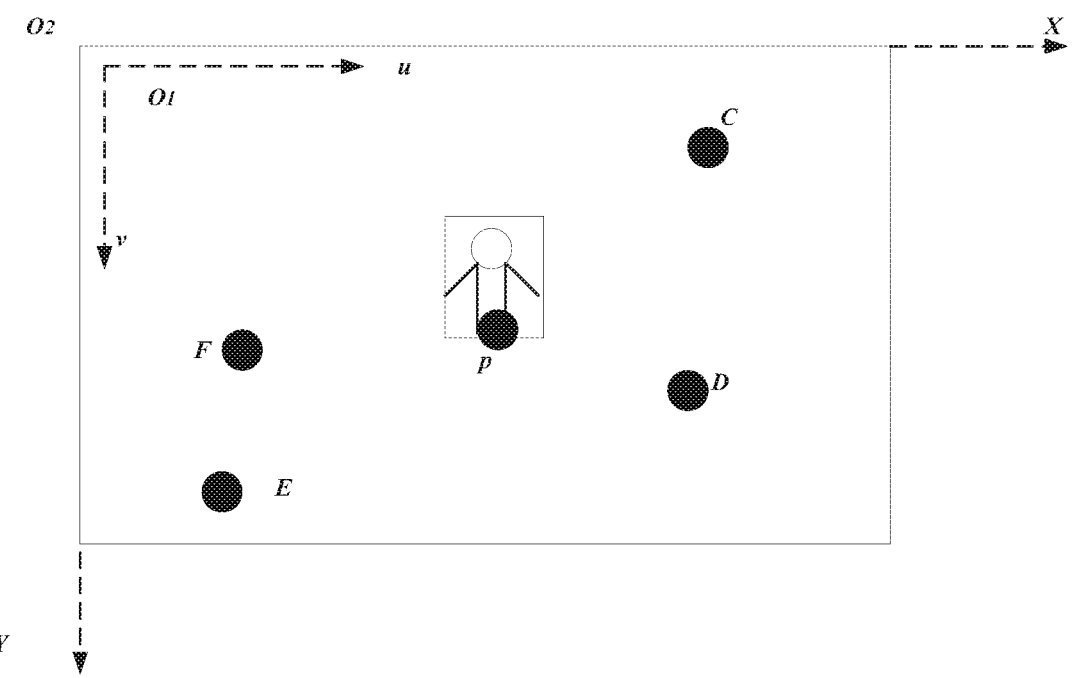
FIG. 8 shows a schematic diagram of a target tracking method according to one embodiment of the present disclosure.

FIG. 8 shows a schematic diagram of a target tracking method according to one embodiment of the present disclosure.

As shown in FIG. 8, the image coordinate system is u-$O_1$-v and the world coordinate system is X—$O_2$—Y. Any 4 points C, D, E, F in the image (these 4 points can be captured simultaneously in the frame image) have coordinates $(X_1, Y_1)$, $(X_2, Y_2)$, $(X_3, Y_3)$ and $(X_4, Y_4)$ in the world coordinate system, and coordinates $(u_1, v_1)$, $(u_2, v_2)$, $(u_3, v_3)$ and $(u_4, v_4)$ in the image coordinate system.

From these 4 points, a homography matrix H between the world coordinate system and the image coordinate system can be obtained:

$$\begin{bmatrix} X_q \\ Y_q \\ 1 \end{bmatrix} = H \begin{bmatrix} u_q \\ v_q \\ 1 \end{bmatrix}, q \in [1, 4]$$

After acquiring H, coordinates $P(u_p, v_p)$ of the pedestrian's feet in the image coordinate system obtained by target detection can be converted into their position $(X_p, Y_p)$ in the world coordinate system using H.

In some embodiments, position information of the current target at a historical time can be determined by using an interpolation method according to position information of the area where the current target is located, for updating a tracking trajectory of the current target. That is, the position information of the target can be determined without performing target detection on all the frame images, and the position information of the target can be acquired through frame skipping processing.

In some embodiments, in the case of skipping L frames (L is an integer greater than or equal to 1), interpolation may be performed based on the target position information $(u_0, v_0)$ in the 0th frame (the first frame in the video) image and the target position information $(u_{L+1}, v_{L+1})$ in the L+1th frame image, to acquire the position information $(u_{L+1}, v_{L+1})$ of the target in the lth (l is a positive integer less than or equal to L) frame image:

$$\begin{cases} u_l = u_0 + \frac{u_{L+1} - u_0}{L+1} \times l \\ v_l = v_0 + \frac{v_{L+1} - v_0}{L+1} \times l \end{cases}$$

By frame skipping processing, the operating efficiency of the system can be improved, and particularly, the operating efficiency can be significantly improved under the condition of fusing the trajectories of multiple cameras.

In some embodiments, the target trajectories acquired by multiple cameras may be fused. This may be achieved, for example, by the embodiment of FIG. 9.

Figure 9:
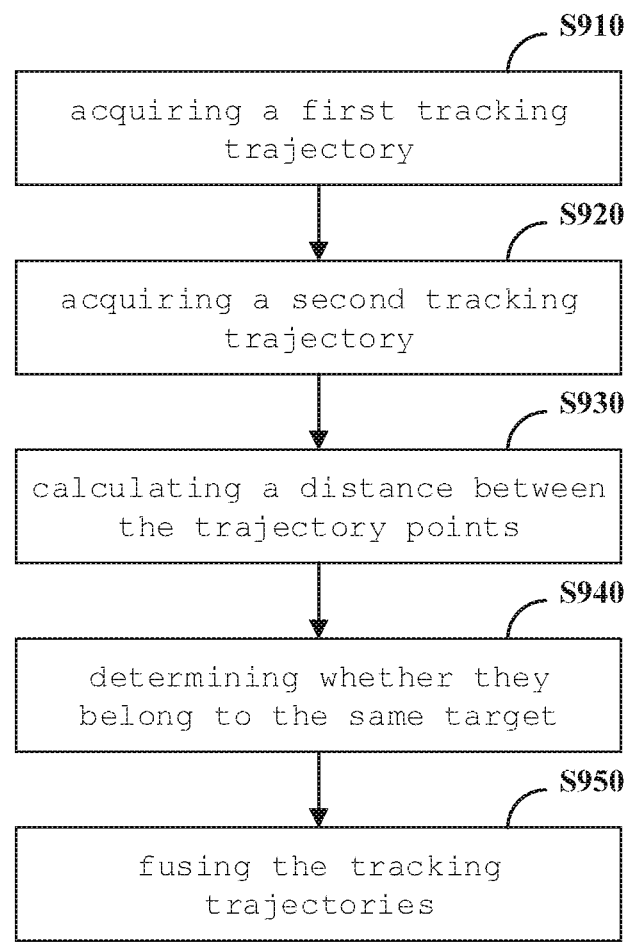
FIG. 9 shows a flowchart of a target tracking method according to yet another embodiment of the present disclosure.

FIG. 9 shows a flowchart of a target tracking method according to yet another embodiment of the present disclosure.

As shown in FIG. 9, the method includes: step S910, acquiring a first tracking trajectory; step S920, acquiring a second tracking trajectory; step S930, calculating a distance between the trajectory points; step S940, determining whether they belong to the same target; and step S950, fusing the tracking trajectories.

In step S910, a first tracking trajectory formed from one or more frame images captured by a first image sensor is acquired.

In step S920, a second tracking trajectory formed from one or more frame images captured by a second image sensor is acquired.

In step S930, a distance between track trajectories of the first tracking trajectory and the second tracking trajectory at a corresponding time is calculated.

In step S940, it is determined whether the first tracking trajectory and the second tracking trajectory belong to the same target according to the distance between the trajectory points.

In step S950, if the trajectories belong to the same target, the first tracking trajectory and the second tracking trajectory are fused into one tracking trajectory.

In some embodiments, multi-camera trajectory fusion may be performed by: respectively calculating a pedestrian trajectory point set $T_a$ determined by the frame image acquired by a camera in the path A and a pedestrian trajectory point set $T_b$ determined by the frame image at a corresponding time acquired by a camera in the path B; calculating Euclidean distances between the positions of P trajectory points in $T_a$ and the positions of Q trajectory points in $T_b$; performing cross-frame image matching on the trajectory points belonging to the $T_a$ and the $T_b$ by using a Hungarian algorithm; and combining the IDs of the targets corresponding to the matched trajectory points, namely marking the targets as the same target.

Figure 10:
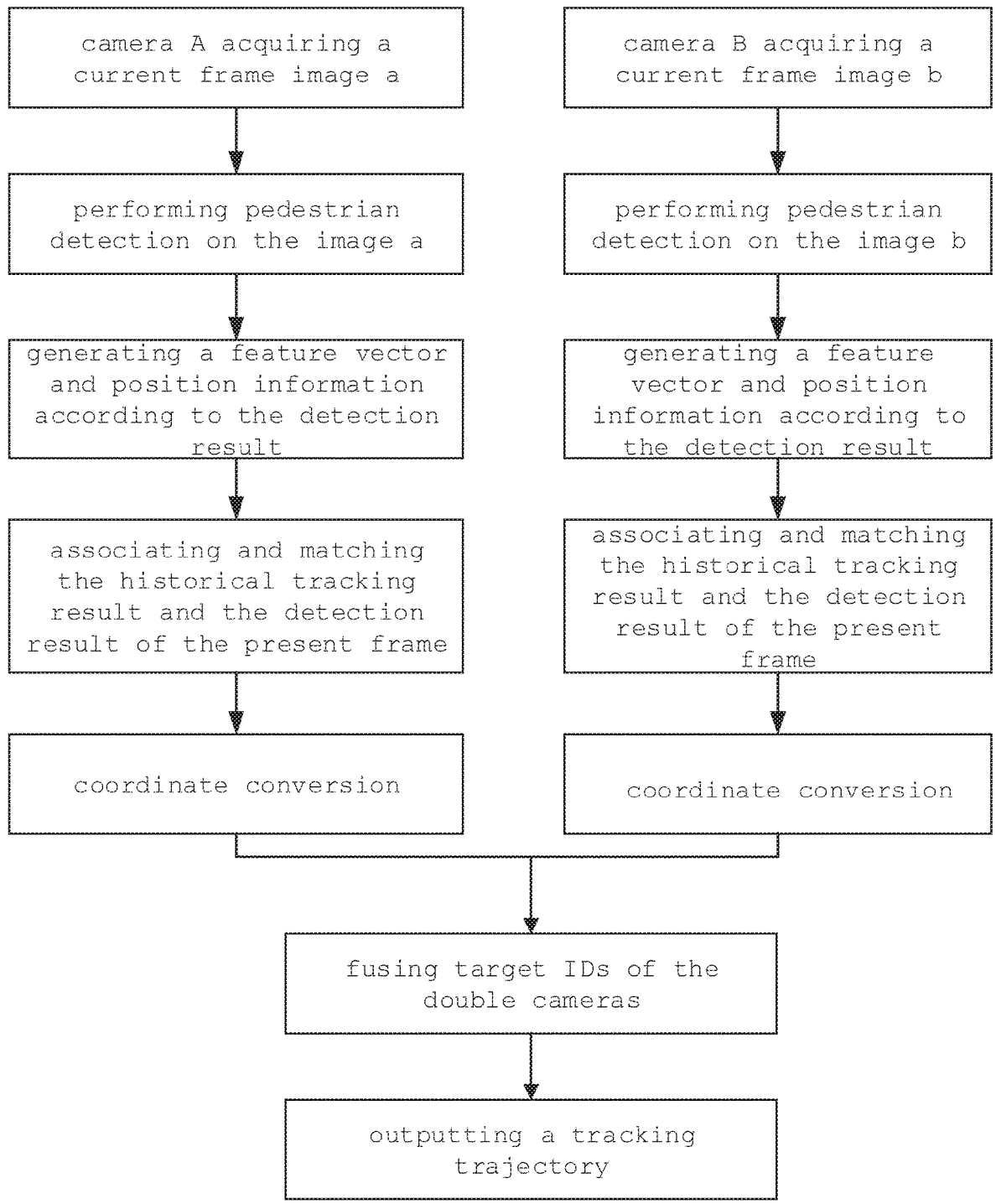
FIG. 10 shows a schematic diagram of a target tracking method according to another embodiment of the present disclosure.

In some embodiments, the trajectory fusion of multiple cameras can be achieved through the embodiment in FIG. 10, thereby improving the accuracy of target tracking.

FIG. 10 shows a schematic diagram of a target tracking method according to another embodiment of the present disclosure.

As shown in FIG. 10, current frame images a and b are acquired by cameras A and B, respectively; pedestrian detection is performed on the current frame images a and b respectively to obtain a pedestrian detection area box (which can be multiple); feature and position information are generated for each pedestrian detection area to characterize a unique characteristic thereof.

If the current frame is the first frame, a new ID is directly assigned to the detected box for marking different people; if the frame is not the first frame, each frame needs to associate and match the detection result box of this frame with the pedestrian (historical tracking result) that has existed before. If the people are considered to be the same person through the algorithm, the ID successfully matched is assigned to the current box; otherwise, a new ID is reassigned; and the historical feature is updated by using the feature of the current frame detection result.

After position coordinates of people with different IDs in the image coordinate system are obtained through the steps, world coordinates in a real scene are obtained according to coordinate conversion. The positions, namely the trajectories, of people with different IDs at different times can be obtained by processing each frame. In consideration of the real-time performance of the system, frame skipping processing may be performed, for example, by skipping 2 frames, the results of frames 1 and 4 are obtained, and the results of frames 2 and 3 are obtained by linear interpolation.

ID fusion is performed on the trajectory of a dual-channel camera, and finally the fused trajectory is output.

Figure 11:
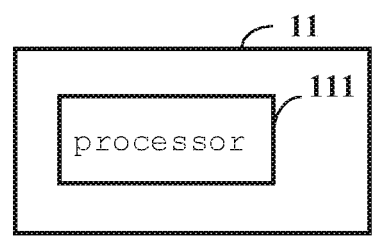
FIG. 11 shows a block diagram of a target tracking device according to one embodiment of the present disclosure.

FIG. 11 shows a block diagram of a target tracking device according to one embodiment of the present disclosure.

As shown in FIG. 11, the target tracking device 11 includes one or more processors 111. The processor 111 is configured to: perform target detection on a current frame image and determine an area where a current target is located; extract a current feature vector and current position information of the area where the current target is located; acquire a historical feature vector and historical position information of an area where each historical target is located in a historical frame image; determine a position difference between the current target and each historical target according to the current position information and each historical position information; determine a feature difference between the current target and said each historical target according to the current feature vector and each historical feature vector; and determine a historical target that is the same target as the current target according to the feature difference and the position difference so as to track the current target.

In some embodiments, the trajectory of the historical target is updated according to the current position information to form a tracking trajectory of the current target.

In some embodiments, the processor 111 is further configured to: acquire a first tracking trajectory formed according to a frame image shot by a first image sensor; acquire a second tracking trajectory formed according to a frame image shot by a second image sensor; calculate a distance between trajectory points of the first tracking trajectory and the second tracking trajectory at a corresponding time; determine whether the first tracking trajectory and the second tracking trajectory belong to the same target according to the distance between the trajectory points; and if they belong to the same target, fuse the first tracking trajectory and the second tracking trajectory into one tracking trajectory.

In some embodiments, the processor 111 is further configured to: acquire a first tracking trajectory formed according to a frame image shot by a first image sensor; acquire a second tracking trajectory formed according to a frame image shot by a second image sensor; calculate a distance between trajectory points of the first tracking trajectory and the second tracking trajectory at a corresponding time; determine whether the first tracking trajectory and the second tracking trajectory belong to the same target or not according to the distance between the trajectory points; and if they belong to the same target, fuse the first tracking trajectory and the second tracking trajectory into one tracking trajectory.

In some embodiments, the processor 111 is further configured to: when it cannot be determined which historical target is the same target as the current target according to the feature difference and the position difference, calculate an overlapping area of the area where the current target is located and the area where each historical target is located; and when the overlapping area is smaller than a threshold, determine the current target as a new target different from said each historical target and as a starting point of a tracking trajectory.

In some embodiments, a distance between the current feature vector and each historical feature vector is calculated; a current similar feature set of the current feature vector is formed by using a plurality of historical feature vectors which are closest to the current feature vector; a distance between the historical feature vector in the current similar feature set and other historical feature vectors in the current similar feature set, and a distance between the historical feature vector and the current feature vector are calculated; a plurality of feature vectors which are closest to the historical feature vector are determined from the other historical feature vectors and the current feature vector to form a historical similar feature set of the historical feature vector; a weight of each historical target to the current target is determined according to the current similar feature set and each historical similar feature set; and a feature difference is determined according to the weight.

In some embodiments, it is determined whether the historical feature vector belongs to the current similar feature set; in the case where the historical feature vector belongs to the current similar feature set, it is determined whether the current feature vector belongs to the historical similar feature set of the historical feature vector; if so, the historical feature vector is determined as a candidate historical feature vector; a first candidate historical feature vector set is formed by utilizing each candidate historical feature vector; and the weight is determined according to the first candidate historical feature vector set.

In some embodiments, the first set of candidate historical feature vectors comprises a first historical feature vector and a second historical feature vector.

In some embodiments, it is determined whether the first historical feature vector belongs to the historical similar feature set of the second historical feature vector; and if so, it is determined whether the second historical feature vector belongs to the historical similar feature set of the first historical feature vector; if so, the second historical feature vector is determined as a nearest neighbor historical feature vector of the first historical feature vector; a nearest neighbor feature vector set of the historical feature vector is formed by using each nearest neighbor historical feature vector of the historical feature vector; a second candidate historical feature vector set is determined according to a nearest neighbor feature vector set of each candidate historical feature vector and the first candidate historical feature vector set; and the weight is determined according to the second candidate historical feature vector set.

In some embodiments, a second candidate historical feature vector set is determined based on a union of the nearest neighbor feature vector set of each candidate historical feature vector and the first candidate historical feature vector set.

In some embodiments, in the case that the historical feature vector does not belong to the second candidate historical feature vector set, a weight of a corresponding historical target of a historical feature vector is determined to be 0; in the case that the historical target feature vector belongs to the second candidate historical feature vector set, the weight of the corresponding historical target of the historical feature vector and a distance between the current feature vector and the historical feature vector are negatively correlated.

In some embodiments, the processor 111 is further configured to: determine position information of the current target at a historical time by using an interpolation method according to position information of the area where the current target is located, for updating a tracking trajectory of the current target.

In some embodiments, nonlinear filtering is used to predict position information of an area where each historical target is located at a current frame time according to each historical position information; and the position difference is determined according to the current position information and the predicted position information.

In some embodiments, when the position difference between the current target and the historical target is greater than a difference threshold, it is determined that the current target and the historical target are not the same target; and when the position difference between the current target and the historical target is smaller than or equal to the difference threshold, it is determined whether the current target and the historical target are the same target according to the feature difference between the current target and the historical target.

Figure 12:
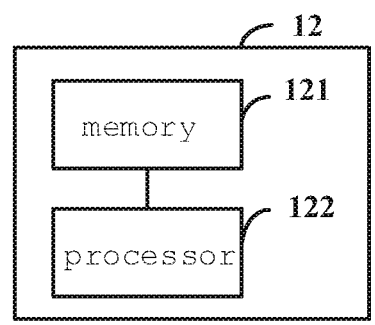
FIG. 12 shows a block diagram of a target tracking device according to another embodiment of the present disclosure.

FIG. 12 shows a block diagram of a target tracking device according to another embodiment of the present disclosure.

As shown in FIG. 12, a target tracking device 12 of this embodiment includes: a memory 121 and a processor 122 coupled to the memory 121, the processor 122 being configured to perform the target tracking method of any of the embodiments in the present disclosure based on instructions stored in the memory 121.

Memory 121 may include, for example, a system memory, a fixed non-volatile storage medium, and the like. The system memory stores, for example, an operating system, an application program, a Boot Loader, a database and other programs.

Figure 13:
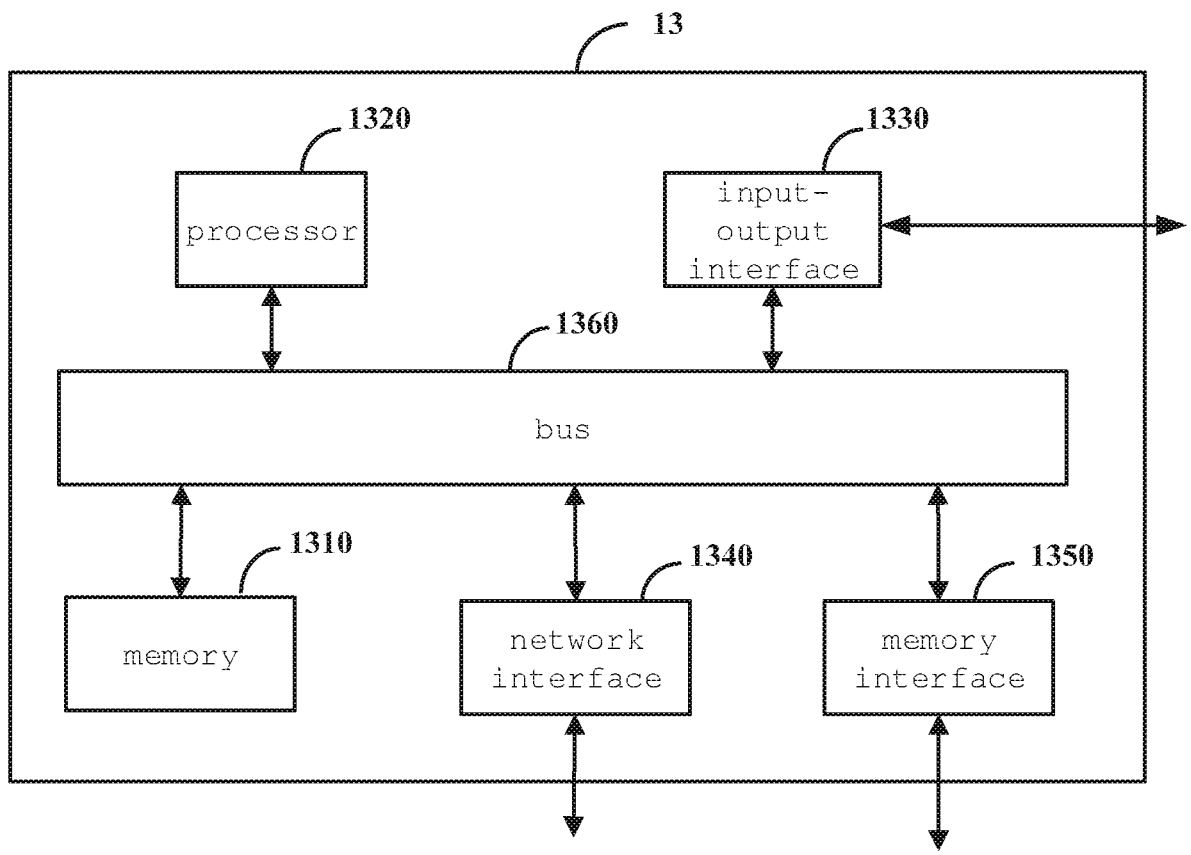
FIG. 13 shows a block diagram of a target tracking device according to yet another embodiment of the present disclosure.

FIG. 13 shows a block diagram of a target tracking device according to yet another embodiment of the present disclosure.

As shown in FIG. 13, a target tracking device 13 of this embodiment includes: a memory 1310 and a processor 1320 coupled to the memory 1310, the processor 1320 being configured to perform the target tracking method of any of the embodiments described above based on instructions stored in the memory 1310.

Memory 1310 may include, for example, a system memory, a fixed non-volatile storage medium, and the like. The system memory stores, for example, an operating system, an application program, a Boot Loader, and other programs.

The target tracking device 13 may also include an input-output interface 1330, a network interface 1340, a storage interface 1350, and etc. These interfaces 1330, 1340, 1350 and the memory 1310 and the processor 1320 may be connected by a bus 1360, for example. The input/output interface 1330 provides a connection interface for input/output devices such as a display, a mouse, a keyboard, and a touch screen. The network interface 1340 provides a connection interface for various networking devices. The storage interface 1350 provides a connection interface for an external storage device such as an SD card and a U disk.

Figure 14:
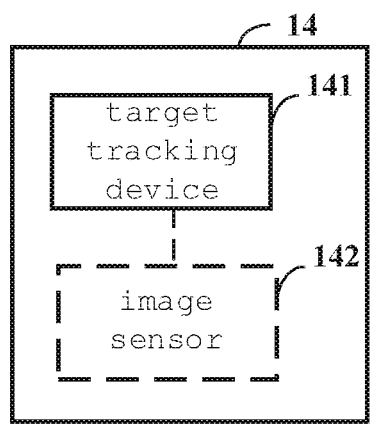
FIG. 14 shows a block diagram of a target tracking system according to one embodiment of the present disclosure.

FIG. 14 shows a block diagram of a target tracking system according to one embodiment of the present disclosure.

As shown in FIG. 14, the target tracking system 14 includes a target tracking device 141 in any of the embodiments described above.

In some embodiments, the target tracking system 14 may further comprise an image sensor 142 for acquiring a frame image containing a target.

Heretofore, all the embodiments of the present disclosure have been described in details. In order to avoid shielding of the concept of the present disclosure, some details commonly known in the art are not described. Based on the above description, those skilled in the art can fully understand how to carry out the technical solutions disclosed here.

While some specific embodiments of the present disclosure have been described in details by way of examples, those skilled in the art should understand that the above examples are for illustrative purposes only and are not intended to limit the scope of the disclosure. Those skilled in the art will appreciate that the above embodiments may be modified or an equivalent substitution may be performed on some of the technical features without departing from the scope and spirit of the present disclosure. The scope of the present disclosure is defined by the appended claims.

What is claimed is:

1. A target tracking method, comprising:
    performing target detection on a current frame image to determine an area where a current target is located;
    extracting a current feature vector and a current position information of the area where the current target is located;
    acquiring a historical feature vector and a historical position information of an area where each historical target is located in one or more historical frame images;
    determining a position difference between the current target and the each historical target according to the current position information and each historical position information;

determining a feature difference between the current target and the each historical target according to the current feature vector and each historical feature vector; and determining a historical target that is the same target as the current target according to the feature difference and the position difference, and tracking the current target;

wherein the tracking the current target comprises:

updating a trajectory of the historical target according to the current position information to form a tracking trajectory of the current target;

the target tracking method further comprising:

acquiring a first tracking trajectory formed according to frame images shot by a first image sensor;

acquiring a second tracking trajectory formed according to frame images shot by a second image sensor;

calculating a distance between trajectory points of the first tracking trajectory and the second tracking trajectory at same moments;

determining whether the first tracking trajectory and the second tracking trajectory belong to the same target according to the distance between the trajectory points; and fusing the first tracking trajectory and the second tracking trajectory into one tracking trajectory if the first tracking trajectory and the second tracking trajectory belong to the same target, wherein determining a feature difference between the current target and the each historical target comprises:

calculating a distance between the current feature vector and the each historical feature vector;

forming a current similar feature set of the current feature vector by using a plurality of historical feature vectors which are closest to the current feature vector;

calculating a distance between the each historical feature vector in the current similar feature set and other historical feature vectors in the current similar feature set, and a distance between the each historical feature vector and the current feature vector;

determining a plurality of feature vectors which are closest to the each historical feature vector from the other historical feature vectors and the current feature vector to form a historical similar feature set of the each historical feature vector;

determining a weight of the each historical target to the current target according to the current similar feature set and each historical similar feature set; and determining the feature difference according to the weight.

2. The target tracking method according to claim 1, further comprising:

when it cannot be determined which historical target is the same target as the current target according to the feature difference and the position difference, calculating an overlapping area of the area where the current target is located and the area where each historical target is located and determining the current target as a new target different from the each historical target and as a starting point of a tracking trajectory if the overlapping area is smaller than a threshold; or determining position information of the current target at one or more historical moments by using an interpolation method according to the position information of the area where the current target is located, and updating a tracking trajectory of the current target according to the position information of the current target at one or more historical moments.

3. The target tracking method according to claim 1, wherein determining a weight of the each historical target to the current feature vector comprises:

determining whether a historical feature vector belongs to the current similar feature set;

in the case where the historical feature vector belongs to the current similar feature set, determining whether the current feature vector belongs to the historical similar feature set of the historical feature vector;

in the case where the current feature vector belongs to the historical similar feature set of the historical feature vector, determining the historical feature vector as a candidate historical feature vector;

forming a first candidate historical feature vector set by using each candidate historical feature vector; and determining the weight according to the first candidate historical feature vector set.

4. The target tracking method according to claim 3, wherein: the first candidate historical feature vector set comprises a first historical feature vector and a second historical feature vector; and the determining the weight according to the first candidate historical feature vector set comprises:

determining whether the first historical feature vector belongs to the historical similar feature set of the second historical feature vector;

in the case where the first historical feature vector belongs to the historical similar feature set of the second historical feature vector, determining whether the second historical feature vector belongs to the historical similar feature set of the first historical feature vector;

in the case where the second historical feature vector belongs to the historical similar feature set of the first historical feature vector, determining the second historical feature vector as a nearest neighbor historical feature vector of the first historical feature vector;

forming a nearest neighbor feature vector set of the each historical feature vector by using each nearest neighbor historical feature vector of the each historical feature vector;

determining a second candidate historical feature vector set according to the nearest neighbor feature vector set of each candidate historical feature vector and the first candidate historical feature vector set; and determining the weight according to the second candidate historical feature vector set.

5. The target tracking method according to claim 4, wherein determining a second candidate historical feature vector set comprises:

determining the second candidate historical feature vector set according to a union of the nearest neighbor feature vector set of each candidate historical feature vector and the first candidate historical feature vector set.

6. The target tracking method according to claim 4, wherein determining the weight according to the second candidate historical feature vector set comprises:

in the case where the historical feature vector does not belong to the second candidate historical feature vector set, determining a weight of a corresponding historical target of the historical feature vector to be 0; and in the case where the historical feature vector belongs to the second candidate historical feature vector set, negatively correlating the weight of the corresponding historical target of the historical feature vector and a distance between the current feature vector and the historical feature vector.

7. The target tracking method according to claim 1, wherein determining a position difference between the current target and the each historical target comprises:
predicting position information of the area wherein the each historical target is located at a corresponding moment of the current frame image by using nonlinear filtering according to the each historical position information; and
determining the position difference according to the current position information and the predicted position information.

8. The target tracking method according to claim 1, wherein determining a historical target that is the same target as the current target according to the feature difference and the position difference comprises:
in the case where the position difference between the current target and a historical target is greater than a difference threshold, determining that the current target and the historical target are not the same target; and
in the case where the position difference between the current target and a historical target is smaller than or equal to the difference threshold, determining whether the current target and the historical target are the same target according to the feature difference between the current target and the historical target.

9. A target tracking device, comprising:
a memory; and
a processor coupled to the memory, the processor configured to perform the target tracking method of claim 1 based on instructions stored in the memory.

10. A non-transitory computer readable storage medium having stored thereon a computer program which, when executed by a processor, implements the target tracking method of claim 1.

11. A target tracking device, comprising one or more processors configured to:
perform target detection on a current frame image to determine an area where a current target is located;
extract a current feature vector and a current position information of the area where the current target is located;
acquire a historical feature vector and a historical position information of an area where each historical target is located in one or more historical frame images;
determine a position difference between the current target and the each historical target according to the current position information and each historical position information;
determine a feature difference between the current target and the each historical target according to the current feature vector and each historical feature vector; and
determine a historical target that is the same target as the current target according to the feature difference and the position difference, and tracking the current target;
wherein tracking the current target comprises:
updating a trajectory of the historical target according to the current position information to form a tracking trajectory of the current target;
the processor is further configured to:
acquire a first tracking trajectory formed according to frame images shot by a first image sensor;
acquire a second tracking trajectory formed according to frame images shot by a second image sensor;
calculate a distance between trajectory points of the first tracking trajectory and the second tracking trajectory at same moments;
determine whether the first tracking trajectory and the second tracking trajectory belong to the same target according to the distance between the trajectory points; and
fuse the first tracking trajectory and the second tracking trajectory into one tracking trajectory if the first tracking trajectory and the second tracking trajectory belong to the same target,
wherein determining a feature difference between the current target and the each historical target comprises:
calculating a distance between the current feature vector and the each historical feature vector;
forming a current similar feature set of the current feature vector by using a plurality of historical feature vectors which are closest to the current feature vector;
calculating a distance between the each historical feature vector in the current similar feature set and other historical feature vectors in the current similar feature set, and a distance between the each historical feature vector and the current feature vector;
determining a plurality of feature vectors which are closest to the each historical feature vector from the other historical feature vectors and the current feature vector to form a historical similar feature set of the each historical feature vector;
determining a weight of the each historical target to the current target according to the current similar feature set and each historical similar feature set; and
determining the feature difference according to the weight.

12. The target tracking device according to claim 11, wherein the processor is further configured to:
when it cannot be determined which historical target is the same target as the current target according to the feature difference and the position difference, calculating an overlapping area of the area where the current target is located and the area where each historical target is located and determining the current target as a new target different from the each historical target and as a starting point of a tracking trajectory if the overlapping area is smaller than a threshold; or
determining position information of the current target at one or more historical moments by using an interpolation method according to the position information of the area where the current target is located, and updating a tracking trajectory of the current target according to the position information of the current target at one or more historical moments.

13. The target tracking device according to claim 11, wherein determining a position difference between the current target and the each historical target comprises:
predicting position information of the area wherein the each historical target is located at a corresponding moment of the current frame image by using nonlinear filtering according to the each historical position information; and
determining the position difference according to the current position information and the predicted position information.

14. A target tracking system, comprising:
the target tracking device of claim 11; and
an image sensor for acquiring a frame image containing a target.

* * * * *